Oct. 7, 1941.  H. GASTROW  2,258,093
MOLD CLOSING MECHANISM
Filed April 14, 1938

INVENTOR
HANS GASTROW
BY Young Emery & Thompson
ATTYS.

Patented Oct. 7, 1941

2,258,093

UNITED STATES PATENT OFFICE 2,258,093

MOLD CLOSING MECHANISM

Hans Gastrow, Zerbst, Anhalt, Germany

Application April 14, 1938, Serial No. 202,109
In Germany April 15, 1937

3 Claims. (Cl. 74—38)

The invention relates to a mold closing mechanism for injection molding machines, more particularly for injection molding machines operating on plastic materials, and has for its object to provide a mechanism which is adapted both to open and close the mold as well as to produce pressure holding the mold closed during the molding operation.

As is known, the pressure required to hold the mold closed in the injection molding of plastic materials assumes very considerable values, e. g. 50,000 kgs. and more. If, as is usual, an electric motor is employed for driving the mold closing mechanism, then taking account of the transmission arrangement interposed between the motor and the mold closing mechanism this motor must produce a torque corresponding to the mold closing pressure. As the magnitude of the torque corresponds with the size of the motor it has been necessary with the transmission means hitherto known to make the motor comparatively large although only a very small power is required for the actual opening and closing movement.

It is an object of the invention to provide transmission means for use between the motor and the mold section which is moved by the motor and so constructed that large closing pressures can be produced with a comparatively small motor. For this purpose the drive of the movable mold section is effected by means of a double toggle mechanism, the toggle link which is driven by the motor being connected therewith by way of a planetary gearing. This gearing consists of two internally toothed rings arranged side by side and having a slightly different number of teeth. One toothed ring is stationary and the other is connected with the driven link of the toggle linkage. Both toothed rings are engaged by toothed wheels which rotate with the motor shaft and in so doing roll over the toothed rings. As a result there is a rotation of the movable toothed ring corresponding to the difference in the number of teeth in the two toothed rings. By providing a comparatively high number of teeth in each toothed ring with only a small difference in the numbers of teeth, it is possible to obtain very high transmission ratios.

One embodiment of the invention will be described by way of example with reference to the accompanying drawing, in which.

Figure 1:
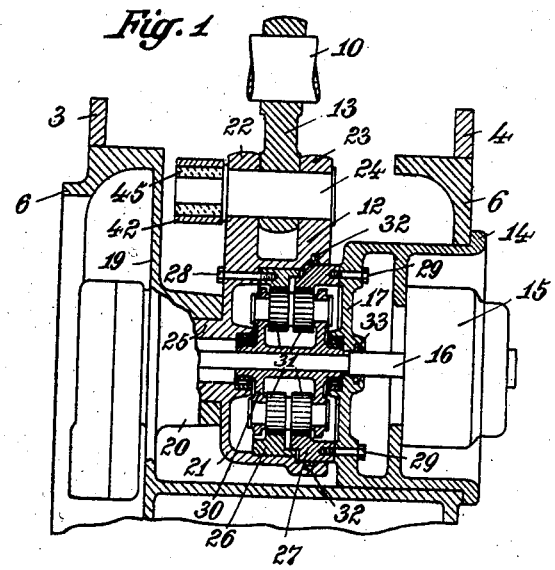
Fig. 1 shows a section through the mechanism operating the toggle linkage.
Figure 2:
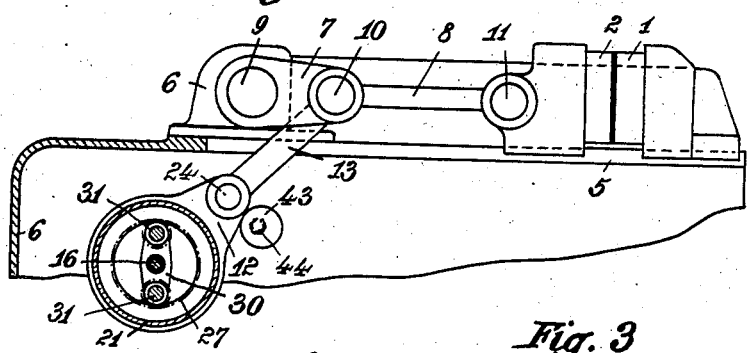
Fig. 2 is a side view of the mold closing mechanism in part section.
Figure 3:
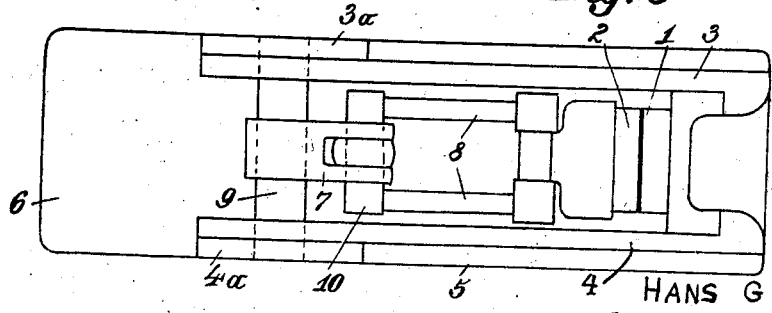
Fig. 3 is a plan view corresponding to Fig. 2.

In the drawing the stationary mold section is indicated at 1 and the movable mold section at 2. The mold sections are guided on two rails 3 and 4, which are bolted to the table 5 of the cast housing 6.

Movement is imparted to the movable mold section 2 by means of a toggle linkage 7, 8. The link 7 is connected with a shaft 9 which is mounted in the rails 3, 4 and the bearing members 3a, 4a. The links 7 and 8 are connected together by the shaft 10. A further shaft 11 serves for mounting the link 8 at the movable mold section 2.

The toggle linkage 7, 8 is actuated by means of a further toggle linkage 12, 13. The link 13 is also mounted on the shaft 10. The manner in which the lever 12 is mounted and driven is shown in Fig. 1. Mounted in the housing 6 is a cup-shaped casting 14, which accommodates the electric motor 15 from which the drive is derived. The driving shaft 16 of the motor 15 passes through the bottom 17 of the casting 14 and is journalled in this bottom. The wall of the housing 6 opposite the motor 15 is provided with a web 19 provided with an integral flange 20. The lever 12 is mounted in this flange 20. The lever 12 consists of a cup-shaped housing 21 with two integral bearing straps 22, 23 accommodating a shaft 24 which serves for the pivotal connection of the lever 12 with the link 13.

The housing 21 is provided with an integral flange 25, which is mounted in the flange 20 of the web 19.

The transmission mechanism consists of two internally toothed rings 26, 27. In the embodiment shown both these rings have the same internal diameter. The ring 26 is secured to the lever 12 by means of bolts 28 and the ring 27 is secured by bolts 29 to the base 17 of the casting 14. The rings have different numbers of teeth being of equal nodule. For example, the ring 27 may have eigthy-one teeth and the ring 26 may have seventy-eight teeth.

Keyed on the shaft 16 is a casting or bearing member 30 of H-shaped cross section. Journalled in this casting 30 are pairs of gear wheels 31 which engage with the toothed wheels. Any desired number of pairs of wheels can be provided. When the shaft 16 rotates, the wheels 31 roll on the stationary toothed ring 27. If the toothed rings 26 and 27 have the same number of teeth the toothed ring 26 also would be stationary, but as it has a different number of teeth there is a slow rotation of this toothed ring with corresponding movement of the lever 12.

By making the lever 12 in the form of a housing it is possible for the gearing to be enclosed in an oil-tight and dust-tight manner. To ensure that this result is obtained, a packing 32 is inserted between the stationary toothed ring 27 and the housing portion 21 of the movable lever 12. In addition a packing 33 is provided where the shaft 16 passes through the base 17 of the cup-shaped casting 14.

To limit the movement of the toggle linkage 12, 13 a stop is provided on the housing 6. This stop consists of a circular eccentrically mounted disc 43 which can be secured in any desired position by means of a bolt 44. Due to the eccentric mounting of the disc 43, it is thus possible to adjust the stop in a simple way. A ring 42 carried on the shaft 24 engages the stop 43. To cushion the impact when the ring 42 encounters the stop 43, a rubber ring 45 is inserted between the ring 42 and the shaft 24.

I claim:

1. A mold closing mechanism for a pair of relatively movable mold sections comprising a motor, a shaft driven by said motor, two pairs of toothed wheels, means secured to said shaft whereby the toothed wheels revolve in diametrically opposite pairs about the axis of the shaft during the rotation of the latter, an internally toothed ring in mesh with one pair of wheels and rigidly mounted on said base, a second internally toothed ring with a different number of teeth mounted adjacent the first-mentioned toothed ring and in mesh with the other pair of wheels, said rings being of equal nodule, a toggle link formed at one end as a housing accommodating and rigidly connected with said second-mentioned ring and embracing said first ring, and a second toggle link transmitting the movement of the second-mentioned ring and the first-mentioned toggle link to effect the opening and closing of the movable mold section.

2. A mold closing mechanism for a pair of relatively movable mold sections, comprising a toggle linkage transmitting a movement to effect the opening and closing of the movable mold section, a planetary gearing imparting the movement to one of the toggle links, means for driving said gearing, and an eccentric stop adjustably secured in a fixed position for limiting the movement of said link associated with the planetary gearing.

3. A mold closing mechanism for a pair of relatively movable mold sections, comprising a toggle linkage transmitting a movement to effect the opening and closing of the movable mold section, a planetary gearing imparting the movement to one of the toggle links, a motor for driving said gearing, a stop for limiting the movement of said link associated with the planetary gearing, a pin provided on said link for co-operation with said stop, a resilient cushioning ring surrounding the pin, and a stop-engaging ring carried around said cushion.

HANS GASTROW.